United States Patent
Schwager et al.

(12) 
(10) Patent No.: US 6,300,434 B1
(45) Date of Patent: *Oct. 9, 2001

(54) PROPYLENE-ETHYLENE COPOLYMERS MADE FROM THREE DIFFERENT CONSTITUENTS

(75) Inventors: Harald Schwager, Speyer; Juergen Kerth, Carlsberg, both of (DE)

(73) Assignee: Basell Polyolefin GmbH, Ludwigshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/524,024

(22) Filed: Sep. 6, 1995

Related U.S. Application Data

(60) Continuation of application No. 08/304,820, filed on Sep. 13, 1994, now abandoned, which is a division of application No. 08/121,462, filed on Sep. 16, 1993, now abandoned, which is a continuation-in-part of application No. 07/888,720, filed on May 27, 1992, now abandoned.

(30) Foreign Application Priority Data

May 31, 1991 (DE) .................................................. 41 17 842

(51) Int. Cl.[7] ....................................................... C08F 4/02
(52) U.S. Cl. ........................... 526/129; 526/348; 526/347; 526/351; 526/352; 526/158; 526/124.5; 525/53; 525/247; 525/268; 525/270; 525/322
(58) Field of Search ................................ 525/53, 247, 268, 525/270, 322; 526/348, 347, 351, 352, 124.5, 158, 129

(56) References Cited

U.S. PATENT DOCUMENTS

| | | | |
|---|---|---|---|
| 4,547,552 | * 10/1985 | Toyota et al. | 525/323 |
| 4,977,210 | * 12/1990 | Kerth et al. | 525/53 |
| 5,006,600 | 4/1991 | Buechner et al. | 525/53 |
| 5,162,465 | * 11/1992 | Kerth et al. | 526/128 |

FOREIGN PATENT DOCUMENTS 566 021   7/1984  (AU).

* cited by examiner

Primary Examiner—David W. Wu
Assistant Examiner—Ling-Siu Choi
(74) Attorney, Agent, or Firm—Keil & Weinkauf

(57) ABSTRACT

Propylene-ethylene copolymers obtainable by three-step polymerization from the gas phase in an agitated fixed bed by means of a Ziegler-Natta catalyst system which, in addition to a titanium-containing solid component, also contains, as cocatalyst, an aluminum compound, where, in a first polymerization step, propylene is polymerized at from 60 to 90° C. and at from 20 to 40 bar and at a mean residence time of the reaction mixture of from 0.5 to 5 hours, then, in a second polymerization step, a mixture of propylene and ethylene is polymerized onto the polymer obtained from the first polymerization step at from 40 to 110° C. and from 5 to 30 bar, this pressure being at least 7 bar below the pressure in the first polymerization step, and at a mean residence time of the reaction mixture of from 0.2 to 4 hours, and then, in a third polymerization step, ethylene or a mixture of ethylene and propylene is polymerized onto the polymer obtained from the second polymerization step at from 40 to 110° C. and from 5 to 30 bar and at a mean residence time of the reaction mixture of from 0.1 to 5 hours, the weight ratio between the monomers reacted in the first and second polymerization steps being adjusted to from 1:1 to 20:1 and the weight ratio between the monomers reacted in the first two polymerization steps and those reacted in the third polymerization step being adjusted to from 1:2 to 20:1.

8 Claims, No Drawings

PROPYLENE-ETHYLENE COPOLYMERS MADE FROM THREE DIFFERENT CONSTITUENTS

This application is a continuation of application Ser. No. 08/304,820, filed on Sep. 13, 1994, abandoned. which is a divisional of application Ser. No. 08/121,462, filed on Sep. 16, 1993, abandoned. which is a continuation-in-part of application Ser. No. 07/888,720, filed on May 27, 1992 abandoned.

Propylene-ethylene copolymers obtainable by three-step polymerization from the gas phase in an agitated fixed bed by means of Ziegler-Natta catalyst system which, in addition to a titanium-containing solid component, also contains, as cocatalyst, an aluminum compound, where, in a first polymerization step, propylene is polymerized at from 60 to 90° C. and at from 20 to 40 bar and at a mean residence time of the reaction mixture of from 0.5 to 5 hours, then, in a second polymerization step, a mixture of propylene and ethylene is polymerized onto the polymer obtained from the first polymerization step at from 40 to 110° C. and from 5 to 30 bar, this pressure being at least 7 below the pressure in the first polymerization step, and at a mean residence time of the reaction mixture of from 0.2 to 4 hours, and then, in a third polymerization step, ethylene or a mixture of ethylene and propylene is polymerized onto the polymer obtained from the second polymerization step at from 40 to 110° C. and from 5 to 30 bar and at a mean residence time of the reaction mixture of from 0.1 to 5 hours, the weight ratio between the monomers reacted in the first and second polymerization steps being adjusted to from 1:1 to 20:1 and the weight ratio between the monomers reacted in the first two polymerization steps and those reacted in the third polymerization step being adjusted to from 1:2 to 20:1.

In addition, the present invention relates to a process for the preparation of these propylene-ethylene copolymers and to films and moldings made from these copolymers.

Propylene-ethylene copolymers obtainable by polymerization on Ziegler-Natta catalyst have already been described in a number of patent specifications. U.S. Pat. No. 4,260,710 discloses the preparation of homopolymers and copolymers of alk-1-enes by polymerization in a stirred reactor with the aid of Ziegler-Natta catalysts. The catalyst components used here contain, inter alia, compounds of polyvalent titanium, aluminum halides and/or alkylaluminum compounds, and electron-donor compounds, where silanes, esters, ethers, ketones or lactones are usually used (EP-B 14 523, EP-B 45 977, EP-B 86 473, EP-A 171 200 and U.S. Pat. No. 4,857,613).

Furthermore, a number of processes have been disclosed, for the preparation of propylene-ethylene block copolymers with the aid of a Ziegler-Natta catalyst system (U.S. Pat. No. 4,454,299, U.S. Pat. No. 4,455,405, ZA-B 0084/3561, ZA-B 0084/3563, ZA-B 0084/5261 and GB-B 1,032,945), in which gaseous propylene is first polymerized in a first reaction step, and the resultant homopolymer is subsequently passed to a second reaction step where a mixture of ethylene and propylene is polymerized on. The process is usually carried out at superatmospheric pressure and in the presence of hydrogen as molecular weight regulator. The copolymers obtainable in this process usually have excellent impact strength, but, in addition to reduced rigidity, also have a relatively high tendency toward stress whitening. For the purpose of the present invention, stress whitening is taken to mean the white coloration of a previously transparent sample in individual areas which occur in many plastics during stretching.

A combination of various mechanical properties, in particular high impact strength, and still sufficiently high rigidity can be observed, in particular, in polymer blends. Thus, for example, the properties of rigid, heat-resistant polymers can be combined with those of soft, resilient polymers by mixing in such a manner that the resultant blends have an advantageous combination of the good properties of the two types of polymer (Saechtling, Kunstoff-Taschenbuch, Carl-Hanser-Verlag, Munich, page 8 [1986]).

The earlier applications DE-A 40 19 455 and DE-A 40 19 456 discloses, for example, blends of different types of polyolefin which have high impact strength, high rigidity and a low tendency toward stress whitening. Blends of this type are obtained by mixing certain propylene copolymers, which themeselves comprise propylene homopolymers and random propylene copolymers, with polyethylenes. However, the preparation of these blends is technically relatively complex. First, it is necessary to prepare propylene copolymers by a two-step process where propylene is polymerized in a first step and a mixture of propylene and ethylene is subsequently polymerized onto the resultant propylene polymer in a second step. Independently thereof, a polyethylene having a certain density is prepared in a further process step. The polymers obtained in this way, the propylene copolymer and the polyethylene, are then usually mixed with one another in an extruder. This preparation process gives products having good applicational properties, but, in addition to the actual polymerization steps, also requires an additional mixing step, which causes problems in coordinating the individual process steps in terms of time and increases the apparative complexity of the process.

It is an object of the present invention to overcome the above disadvantages and to develop propylene-ethylene copolymers which have good applicational properties and can be prepared in a very simple manner. Among the good applicational properties of the propylene-ethylene copolymers of this invention is a reduced amount of chlorine in the polymer. This increases the applicability of the polymers for use in food packaging.

We have found that this object is achieved by the novel propylene-ethylene copolymers defined at the outset.

The process which gives these copolymers can be carried out either batchwise or preferably continuously in the conventional reactors used for the polymerization of propylene. Suitable reactors are, inter alia, continuously operated stirred reactors, it also being possible to employ a series of stirred reactors connected in series. The reactors contain a fixed bed of finely divided polymer which is usually kept in motion by stirring.

The process can be carried out using the Zeigler-Natta catalyst which are conventional in polymerization technology. In addition to a titaninum-containing solid component, these also contain , inter alia, a cocatalyst. Suitable cocatalysts are aluminum compounds. In addition to this aluminum compound, an electron-donor compound is preferably also employed as a further constituent in the cocatalyst.

The titanium-containing solid component is generally prepared using, as titanium compound, a halide or alkoxide of trivalent or tetravalent titanium, preference being given to titanium chlorides, in particular titanium tetrachloride. The titanium-containing solid component advantageously contains a finely divided carrier, for which purpose silica, alumina and aluminosilicates have proven successful. Particularly preferred carriers are silica or an aluminosilicate of the formula $SiO_2 \cdot aAl_2O_3$ where a is from 0.001 to 2, in particular from 0.01 to 0.5.

The preparation of the titanium-containing solid component is also carried out using, inter alia, compounds of magnesium, in particular magnesium halides, alkylmagnesium compounds and arylmagnesium compounds, and alkoxymagnesium and aryloxymagnesium compounds, preferably magnesium dichloride, magnesium dibromide and magnesium di($C_1$–$C_{10}$-alkyl) compounds. In addition, the titanium-containing solid component may also contain halogen, preferably chlorine or bromine.

Furthermore, the titanium-containing solid component also contains electron-donor compounds, for example monofunctional or polyfunctional carboxylic acids, carboxylic anhydrides and carboxylic esters, furthermore ketones, ethers, alcohols, lactones, and organophosphorus and organosilicon compounds. Preferred electron-donor compounds within the titanium-containing solid component are phthalic acid derivatives of the general formula I

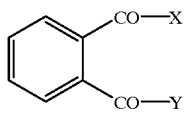

where X and Y are each chlorine or $C_1$- to $C_{10}$-alkoxy or together are oxygen. Particularly preferred electron-donor compounds are phthalic esters, where X and Y are $C_1$–$C_8$-alkoxy, for example methoxy, ethoxy, propoxy or butoxy.

Other preferred electron-donor compounds within the titanium-containing solid component are, inter alia, diesters of 3- or 4-membered, substituted or unsubstituted cycloalkyl-1,2-dicarboxylic acids, and monoesters of substituted or unsubstituted benzophenone-2-carboxylic acids. The hydroxyl compounds used in these esters are alcohols which are customary in esterification reactions, inter alia $C_1$- to $C_{15}$-alkanols, $C_5$- to $C_7$-cycloalkanols which can themselves carry $C_1$- to $C_{10}$-alkyl groups, and furthermore $C_6$- to $C_{10}$-phenols.

The titanium-containing solid component can be prepared by conventional methods, for example as described, inter alia, in EP-A 45 975, EP-A 45 977, EP-A 86 473, EP-A 171 200, GB-A 2,111,006 and U.S. Pat. No. 4,857,613.

The titanium-containing solid component is preferably prepared by the three-step process described below.

In the first step, a solution of the magnesium-containing compound in a liquid alkane is first added to a finely divided carrier, preferably silica or an aluminosilicate of the formula $SiO_2 \cdot aAl_2O_3$, where a is from 0.001 to 2, in particular from 0.01 to 0.5, which in general has a particle diameter of from 0.1 to 1000 μm, in particular from 10 to 300 μm, a pore volume of from 0.1 to 10 $cm^3/g$, in particular from 1.0 to 4.0 $cm^3/g$, and a specific surface area of from 10 to 1000 $m^2/g$, in particular from 100 to 500 $m^2/g$, and this mixture is then stirred for from 0.5 to 5 hours at from 10 to 120° C. From 0.1 to 1 mol of the magnesium compound is preferably employed per mole of the carrier. A halogen or a hydrogen halide, in particular chlorine or hydrogen chloride, in a two-fold, preferably five-fold, molar excess or more, based on the magnesium-containing compound, is then added with constant stirring. After from about 30 to 120 minutes, the solid is separated from the liquid phase.

In the second step, the product obtained in this way is introduced into a liquid alkane, and a $C_1$- to $C_8$-alkanol, in particular ethanol, a halide or an alkoxide of trivalent or tetravalent titanium, in particular titanium tetrachloride, and an electron-donor compound are then added. From 1 to 5 mol, in particular from 2 to 4 mol, of alkanol, from 2 to 20 mol, in particular from 4 to 10 mol of trivalent or tetravalent titanium and from 0.01 to 1 mol, in particular from 0.1 to 1.0 mol, of the electron-donor compound are employed per mole of magnesium in the solid obtained from the first step. This mixture is stirred for one hour or more at from 10 to 150° C., and the resultant solid is subsequently filtered off and washed with a liquid alkane, preferably hexane or heptane.

In the third step, the solid obtained from the second is extracted for a few hours at from 100 to 150° C. with excess titanium tetrachloride or an excess of a solution of titanium tetrachloride in an inert solvent, preferably an alkylbenzene, the solvent containing 5% by weight or more of titanium tetrachloride. The product is then washed with a liquid alkane until the content of titanium tetrachloride in the washings is less than 2% by weight.

The titanium-containing solid component obtainable in this way is used with a cocatalyst as the Ziegler-Natta catalyst system. Suitable cocatalysts here are aluminum compounds.

Aluminum compounds which are suitable as cocatalysts are trialkylaluminum and compounds in which an alkyl has been replaced by alkoxy or halogen, for example by chlorine or bromine. Preference is given to trialkyl-aluminum compounds whose alkyl groups each have from 1 to 8 carbon atoms, for example trimethylaluminum, triethylaluminum or methyldiethylaluminum.

In addition to the aluminum compound, preference is given as a further cocatalyst to electron-donor compounds, such as monofunctional or polyfunctional carboxylic acids, carboxylic anhydrides and carboxylic esters, furthermore ketones, ethers, alcohols, lactones and organophosphorus and organosilicon compounds. Preferred electron-donor compounds here are organosilicon compounds of the general formula II $$R^1_n Si(OR^2)_{4-n} \qquad \text{II}$$

where $R^1$ is identical or different $C_1$- to $C_{20}$-alkyl, 5- to 7-membered cycloalkyl, which may itself carry $C_1$- to $C_{10}$-alkyl, or $C_6$- to $C_{20}$-aryl or -arylalkyl, $R^2$ is identical or different $C_1$- to $C_{20}$-alkyl, and n is 1, 2 or 3. Particular preference is given to compounds in which $R^1$ is identical or different $C_1$- to $C_8$-alkyl or 5- to 7-membered cycloalkyl, $R^2$ is identical or different $C_1$- to $C_4$-alkyl, and n is 1 or 2.

Of these compounds, dimethoxydiisopropylsilane, dimethoxyisobutylisopropylsilane, dimethoxydiisobutylsilane dimethoxydicyclopentylsilane and diethoxyisobutylisopropylsilane should be particulary emphasized.

Preference is given to catalyst systems in which the atomic ratio between aluminum from the aluminum compound and titanium from the titanium-containing solid component is from 10:1 to 800:1, in particular from 20:1 to 200:1, and the molar ratio between the aluminum compound and the electron-donor compound employed as cocatalyst is from 1:1 to 100:1, in particular from 2:1 to 80:1. The catalyst constituents may be introduced into the polymerization system individually in any desired sequence or as a mixture of two components.

The propylene-ethylene copolymers according to the invention are prepared in particular by a three-step process.

The polymerization of the propylene in the first step is carried out at from 60 to 90° C. and from 20 to 40 bar and at a mean residence time of the reaction mixture of from 0.5 to 5 hours, preferably at from 65 to 85° C. and at from 20 to 35 bar and at a mean residence time of from 0.75 to 4 hours. The reaction conditions are usually selected in such a manner that from 0.05 to 2 kg, preferably from 0.1 to 1.5 kg, of polypropylene are formed per mmol of the aluminum component in the first polymerization step.

In a specific embodiment of the process giving the propylene-ethylene copolymers according to the invention, the monomer mixture from the first polymerization step may contain small amounts of other $C_2$-$C_{10}$-alk -1-enes, for example ethylene, but-1-ene, pent-1-ene, hex-1-ene, hept-1-ene or oct-1-ene. The amount of these comonomers should be limited so that the ratio between the partial pressures of the further $C_2$–$C_{10}$-alk-1-ene and propylene is not more than 1:100, in particular not more than 0.5:100. It is preferred not to use any $C_2$–$C_{10}$-alk-1-enes at all in the first polymerization step.

When the reaction is complete, from the polypropylene is transferred, along with the catalyst, from the first polymerization step into the second, where a mixture of propylene and ethylene is polymerized on. The pressure prevailing in the second polymerization step is 7 bar, preferably 10 bar, below that in the first polymerization step and is from 5 to 30 bar, preferably from 8 to 25 bar. The temperature is from 40 to 110° C., preferably from 50 to 90° C., and the mean residence time of the polymer is from 0.2 to 4 hours, preferably from 0.2 to 2 hours.

The ratio between the partial pressures of propylene and ethylene in the second polymerization step is usually in the range from 1:10 to 10:1, in particular from 1:8 to 5:1. It should furthermore be ensured, through a suitable choice of reaction parameters, that the weight ratio between the monomers reacted in the first and second polymerization steps is from 1:1 to 20:1, in particular from 1.5:1 to 10:1.

In a further embodiment of the process giving the copolymers according to the invention, a $C_1$- to $C_8$-alkanol, in particular a $C_1$–$C_4$-alkanol, which affects the activity of the Ziegler-Natta catalyst is added to the reaction mixture in the second polymerization step. Alkanols which are highly suitable for this purpose include methanol, ethanol, n-propanol, n-butanol and very particularly isopropanol.

After completion of the reaction, the resultant mixture of polypropylene and a propylene-ethylene copolymer is transferred, along with the catalyst, from the second polymerization step into the third, where ethylene or a mixture of ethylene and propylene is polymerized on. The pressure prevailing in this third step is usually 7 bar, preferably 10 bar, below that in the first step and is from 5 to 30 bar, preferably from 8 to 25 bar. The temperature is from 40 to 110° C., preferably from 50 to 90° C., and the mean residence time of the polymer is from 0.1 to 5 hours, in particular from 0.2 to 4 hours. If, in this third polymerization step, a mixture of ethylene and propylene is polymerized onto the polymer obtained from the second step, it should be ensured that the ratio between the partial pressures of ethylene and propylene is from 0.5:1 to 100:1, in particular from 2:1 to 80:1. It should also be ensured, in accordance with the invention, that the weight ratio between the monomers reacted in the first two polymerization steps and those reacted in the third step is in the range from 1:2 to 20:1, in particular from 1:1.5 to 10:1.

In a further embodiment of the process giving the copolymers according to the invention, a $C_1$- to $C_8$-alkanol, in particular a $C_1$–$C_4$-alkanol, which affects the activity of the Ziegler-Natta catalyst is added to the reaction mixture in the third polymerization step. Alkanols which are highly suitable for this purpose include methanol, ethanol, n-propanol, n-butanol and very particularly isopropanol.

The process which is likewise according to the invention can be carried out in a single reactor or in a cascade of two, three or more successive reactors. If only one reactor is used, the reactor is decompressed to lower pressure after each completed polymerization step. The reaction parameters required for the next polymerization step are then set, the reaction space is filled with monomers, and the polymerization is carried out afresh in a corresponding manner. In a series of successive reactors, the polymer formed, after completion of the polymerization, is discharged from the particular polymerization step together with the catalyst and transferred into the next polymerization step.

The molecular weight of the resultant polymers can be regulated in a conventional manner by adding regulators, in particular hydrogen.

The propylene-ethylene copolymers according to the invention should be regarded as a mixture of a propylene homopolymer, a propylene-ethylene copolymer having an ethylene content of from 20 to 80% by weight, and a polyethylene or an ethylene-propylene copolymer having an ethylene content of at least 50% by weight. Their melt flow indices are from 0.1 to 100 g/10 min, preferably from 0.2 to 20 g/10 min, in each case measured in accordance with DIN 53 735 at 230° C. and 2.16 kg. The melt flow index corresponds to the amount of polymer forced out of the test apparatus, standardized in accordance with DIN 53 735, in 10 minutes at a temperature of 230° C. and under a weight of 2.16 kg. The copolymers according to the invention have high rigidity, high impact strength and low tendency toward stress whitening. They can be prepared without any significant increase in technical complexity.

Due to their good mechanical properties, these copolymers are particularly suitable for the production of films, tubes, covering, fibers, blow moldings, injection moldings and moldings for automobile production.

EXAMPLES

All examples were carried out in a 10 l stirred autoclave containing an agitated fixed bed of finely divided polypropylene.

In the first step, propylene was polymerized in the presence of 7.1 l of hydrogen as molecular weight regulator with the aid of a Ziegler-Natta catalyst system. The precise reaction conditions, ie. the pressure, temperature and mean residence time of the reaction mixture, are given in Table 1 below.

In all the examples, 100 mg of a titanium-containing solid component, 6 mmol of triethyl-aluminum and 0.6 mmol of dimethoxyisobutylisopropylsilane were used as catalyst components, based on a mean residence time of the reaction mixture of one hour. 0.2 kg of polypropylene were produced per mmol of the aluminum component. The titanium-containing solid component was prepared by the following process.

In a first step, butyloctylmagnesium dissolved in n-heptane was added to $SiO_2$ having a particle diameter of from 20 to 45 µm, a pore volume of 1.75 $cm^3$/g and a surface area of 320 $m^2$/g, 0.3 mol of a magnesium compound being employed per mole of $SiO_2$. The solution was stirred at 90° C. for 1.5 hours and then cooled to 20° C., and 10 times the molar amount, based on the organomagnesium compound, of hydrogen chloride was subsequently passed in. After 30 minutes, the solid phase product was separated off from the solvent.

The product obtainable from the first step was mixed with n-heptane, and 3 mol of ethanol, based on 1 mol of magnesium, was subsequently added with constant stirring. This mixture was stirred at 80° C. for 1.5 hours, and then 6 mol of titanium tetrachloride and 0.5 mol of di-n-butyl phthalate in each case based on 1 mol of magnesium, were added. The reaction mixture was stirred for a further two hours, and the solid was then separated off from the solvent by filtration.

The product obtained in this way was extracted for two hours at 125° C. with a 15 percent strength by weight solution of titanium tetrachloride in ethylbenzene.

The solid product was then separated from the extractant by filtration and washed with n-heptane until the washings contained not more than 0.3% by weight of titanium tetrachloride.

The resultant titanium-containing solid component contained 3.1% by weight of titanium, 7.5% by weight of magnesium and 28.3% by weight of chlorine.

When the polymerization step was complete, the stirred autoclave in all the examples was decompressed to 5 bar, and a mixture of propylene and ethylene was subsequently polymerized therein under the conditions given in Table 1 for the second polymerization step. The polypropylene formed in the first polymerization step remained in the autoclave together with the Ziegler-Natta catalyst.

When the copolymerization was complete, the autoclave in all examples was again decompressed to 5 bar, and a mixture of propylene and ethylene was again polymerized therein under the conditions given in Table 1 for the third polymerization step. The polymers formed in the first two polymerization steps remained in the autoclave together with the Ziegler-Natta catalyst.

The properties of the propylene-ethylene copolymers obtained in all the examples are given in Table 2 below.

TABLE 1

Reaction conditions in the three polymerization steps

| | Examples | | |
|---|---|---|---|
| | 1 | 2 | 3 |
| Polymerization step 1 | | | |
| Pressure [bar] | 28 | 28 | 28 |
| Temperature [° C.] | 70 | 70 | 70 |
| Mean residence time [hours] | 1 | 1 | 1 |
| Polymerization step 2 | | | |
| Pressure [bar] | 10 | 10 | 10 |
| Temperature [° C.] | 70 | 70 | 70 |
| Mean residence time [hours] | 0.5 | 0.5 | 0.5 |
| Propylene:ethylene partial pressure ratio | 1:2 | 1:2 | 1:2 |
| Weight ratio between monomers reacted in the first polymerization step and monomers reacted in the second polymerization step | 4:1 | 4:1 | 4:1 |
| Polymerization step 3 | | | |
| Pressure [bar] | 10 | 10 | 10 |
| Temperature [° C] | 70 | 70 | 70 |
| Mean residence time [hours] | 0.33 | 0.75 | 1.75 |
| Propylene:ethylene partial pressure ratio | 1:9 | 1:9 | 1:9 |
| Weight ratio between monomers reacted in the first two polymerization steps and monomers reacted in the third polymerization step | 5.6:1 | 2.2:1 | 1:1 |

TABLE 2

Properties of the propylene-ethylene copolymers obtained

| | Examples | | |
|---|---|---|---|
| | 1 | 2 | 3 |
| Melt flow index[a] [g/10 min] | | | |
| After the first step | 5.5 | 2.7 | 1.2 |
| After the second step | 5.6 | 2.8 | 1.0 |
| After the third step | 5.3 | 2.6 | <1.0 |
| Rigidity (shear modulus)[b] [N/mm$^2$] | 350 | 275 | 160 |
| Impact Strength [kJ/m$^2$] | no fracture | no fracture | no fracture |
| Notched impact strength[d] [kJ/m$^2$] | 9 | 14 | 100% cracked |
| Stress whitening[e] [mm] | 13 | 0 | 0 |

[a] at 230° C. and 2.16 kg, in accordance with DIN 53 735
[b] in accordance with DIN 53 445
[c] in accordance with DIN 53 453, at −40° C.
[d] in accordance with DIN 53 453, at −40° C.
[e] at 23° C.

Determination of the stress whitening:

The stress whitening was determined in accordance with DIN 53 443, Part 1, using a falling weight tester by using a weight of 250 g, a tup diameter of 5 mm and a head radius of 25 mm. The fall height was 50 cm.

The test specimen used was an injection-molded circular disk having a diameter of 60 mm and a thickness of 2 mm. The specimen was injection-molded at a material temperature of 250° C. and mold-surface temperature of 30° C.

The test was carried out at 23° C., with each specimen only being subjected to one impact test. The specimen was first placed on a support ring without clamping, and the weight was allowed to fall. Each median was formed using 5 specimens.

The diameter of the visible stress whitening mark is given in mm and was determined by measuring the mark in the flow direction and at ninety degrees thereto on the side of the disk facing away from the impact, and the mean was determined from the two valves.

We claim:

1. A process for preparing a propylene-ethylene copolymer which is conducted in three distinct polymerization steps in the gas phase in an agitated fixed bed by means of a Ziegler-Natta catalyst system which, in addition to a titanium-containing solid component based on a finely divided silicia as a carrier, also contains, as cocatalyst, an aluminum compound, which process comprises in a first polymerization step, polymerizing propylene at from 60 to 90° C. and at from 20 to 40 bar and at a mean residence time of the reaction mixture of from 0.5 to 5 hours, then, in a second polymerization step, polymerizing a mixture of propylene and ethylene onto the polymer obtained from the first polymerization step at from 40 to 110° C. and from 5 to 30 bar, this pressure being at least 7 bar below the pressure in the first polymerization step, and at a mean residence time of the reaction mixture of from 0.2 hours to 4 hours, and then, in a third polymerization step, polymerizing ethylene and a mixture of ethylene a propylene onto the polymer obtained from the second polymerization step at from 50 to 110° C. and from 5 to 30 bar and at a mean residence time of the reaction mixture of from 0.1 to 5 hours, the weight ratio between the monomers reacted in the first and second polymerization steps being from 1:1 to 20:1 and the weight ratio between the monomers reacted in the first two polymerization steps and those reacted in the third polymerization step being from 1:2 to 20:1.

2. A process as defined in claim 1, in which the weight ratio between the monomers reacted in the first and second polymerization steps is from 1.5:1 to 10:1.

3. A process as defined in claim 1, in which the weight ratio between the monomers reacted in the first two polymerization steps and those reacted in the third polymerization step is from 1:1.5 to 10:1.

4. A process as defined in claim 1, wherein the three polymerization steps are carried out in successive reactors, the polymer being formed in the first and second steps being transferred to the next reactor.

5. A process as defined in claim 1, wherein the titanium-containing solid component comprises an electron-donor compound of the formula 1

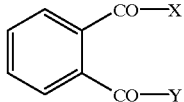

I where X and Y are independently $C_1$–$C_8$-alkoxy.

6. A process as defined in claim 1, wherein the atomic ratio between aluminum from the aluminum compound and titanium-containing solid component is from 20:1 to 200:1.

7. A process as defined in claim 1, wherein the pressure in the second polymerization step is at least 10 bar below that in the first polymerization step.

8. A process as defined in claim 1, wherein the ratio between the partial pressures of propylene and ethylene in the second polymerization step is from 1:8 to 5:1.

* * * * *